United States Patent
James

(10) Patent No.: US 7,830,862 B2
(45) Date of Patent: Nov. 9, 2010

(54) SYSTEM AND METHOD FOR MODIFYING SPEECH PLAYOUT TO COMPENSATE FOR TRANSMISSION DELAY JITTER IN A VOICE OVER INTERNET PROTOCOL (VOIP) NETWORK

(75) Inventor: James H. James, Farmingdale, NJ (US)

(73) Assignee: AT&T Intellectual Property II, L.P., New York, NY (US)

( * ) Notice: Subject to any disclaimer, the term of this patent is extended or adjusted under 35 U.S.C. 154(b) by 1708 days.

(21) Appl. No.: 11/030,785

(22) Filed: Jan. 7, 2005

(65) Prior Publication Data
US 2006/0153163 A1 Jul. 13, 2006

(51) Int. Cl.
H04L 12/66 (2006.01)

(52) U.S. Cl. .................. 370/352; 370/236; 370/335; 370/401; 370/477; 375/225; 455/518; 704/201; 704/270.1; 714/775

(58) Field of Classification Search .......... 370/340, 370/352, 389, 516, 535, 230, 286, 335, 342, 370/401, 477, 521, 236; 455/560, 518; 704/222, 704/211, 214, 219, 220, 228, 275, 201, 270.1; 709/238; 715/256; 375/225; 714/775
See application file for complete search history.

(56) References Cited

U.S. PATENT DOCUMENTS

| | | | |
|---|---|---|---|
| 5,084,891 A * | 1/1992 | Ariyavisitakul et al. | 714/775 |
| 5,341,432 A * | 8/1994 | Suzuki et al. | 704/211 |
| 5,341,456 A * | 8/1994 | DeJaco | 704/214 |
| 5,363,404 A * | 11/1994 | Kotzin et al. | 370/335 |
| 5,717,823 A * | 2/1998 | Kleijn | 704/220 |
| 5,802,105 A * | 9/1998 | Tiedemann et al. | 375/225 |
| 5,933,802 A * | 8/1999 | Emori | 704/219 |
| 6,049,537 A * | 4/2000 | Proctor et al. | 370/342 |
| 6,366,961 B1 * | 4/2002 | Subbiah et al. | 709/238 |
| 6,377,931 B1 | 4/2002 | Shlomot | |
| 6,549,587 B1 | 4/2003 | Li | |
| 6,604,070 B1 * | 8/2003 | Gao et al. | 704/222 |
| 6,611,694 B1 * | 8/2003 | Oltedal et al. | 455/560 |

(Continued)

FOREIGN PATENT DOCUMENTS

WO WO 02/087137 10/2002

OTHER PUBLICATIONS

Agnihotri S et al: "A new technique for improving quality of speech in voice over IP using time-scale modification" 2002 IEEE International Conference on Acoustics. Speech and Signal Processing. Proceedings. (ICASSP) Orlando, FL, May 13-17, 2002, IEEE International Conference on Acoustics, Speech and Signal Processing (ICASSP), New York, NY: IEEE, US, vol. 4 of 4, May 13, 2002, pp. 2085-2088. XP010804312.

(Continued)

*Primary Examiner*—Gerald Gauthier

(57) ABSTRACT

A system and method for reducing delay introduced by de-jitter buffers in a VoIP network is presented. The method aspect for receiving and presenting speech data received from a VoIP network comprises monitoring speech-related packets received from a packet network and based on the monitoring, either maintaining a normal speech rate, compressing the speech rate or expanding the speech rate. The speech associated with the received packets is played out (presented audible via a speaker or other means) at the normal, compressed or expanded speech rate.

17 Claims, 3 Drawing Sheets

U.S. PATENT DOCUMENTS

| | | | |
|---|---|---|---|
| 6,628,629 B1 | 9/2003 | Jorgensen | |
| 6,684,273 B2 | 1/2004 | Boulandet et al. | |
| 6,738,351 B1 | 5/2004 | Qureshi et al. | |
| 6,748,000 B1 | 6/2004 | Vainikainen et al. | |
| 6,757,256 B1 | 6/2004 | Anandakumar et al. | |
| 6,757,367 B1 | 6/2004 | Nicol | |
| 6,760,324 B1 | 7/2004 | Scott et al. | |
| 6,775,265 B1 | 8/2004 | Oran | |
| 6,775,273 B1 | 8/2004 | Kung et al. | |
| 6,775,649 B1 | 8/2004 | DeMartin | |
| 6,788,651 B1 | 9/2004 | Brent et al. | |
| 6,788,675 B1 | 9/2004 | Yang et al. | |
| 6,801,523 B1 | 10/2004 | Osman | |
| 6,829,254 B1 * | 12/2004 | Rajahalme et al. | 370/535 |
| 6,862,298 B1 * | 3/2005 | Smith et al. | 370/516 |
| 6,865,173 B1 * | 3/2005 | Czaja et al. | 370/342 |
| 6,885,638 B2 * | 4/2005 | Xu et al. | 370/230 |
| 7,113,514 B2 * | 9/2006 | Tahernezhaadi et al. | 370/401 |
| 7,254,120 B2 * | 8/2007 | LeBlanc | 370/335 |
| 7,266,382 B2 * | 9/2007 | Noel et al. | 455/518 |
| 7,295,549 B2 * | 11/2007 | Pepin et al. | 370/352 |
| 7,509,255 B2 * | 3/2009 | Takeishi et al. | 704/228 |
| 7,649,856 B2 * | 1/2010 | Sung et al. | 370/286 |
| 7,664,646 B1 * | 2/2010 | James et al. | 704/270.1 |
| 2003/0033149 A1 * | 2/2003 | Milligan et al. | 704/275 |
| 2003/0152089 A1 * | 8/2003 | Tahernezhaadi et al. | 370/401 |
| 2003/0231594 A1 * | 12/2003 | Xu et al. | 370/236 |
| 2004/0088161 A1 * | 5/2004 | Corrigan et al. | 704/211 |
| 2004/0170164 A1 * | 9/2004 | LeBlanc et al. | 370/389 |
| 2004/0213203 A1 | 10/2004 | Lucioni | |
| 2005/0032538 A1 * | 2/2005 | Noel et al. | 455/518 |
| 2005/0032539 A1 * | 2/2005 | Noel et al. | 455/518 |
| 2005/0075860 A1 * | 4/2005 | Takeishi et al. | 704/201 |
| 2006/0034340 A1 * | 2/2006 | Rong et al. | 370/521 |
| 2006/0153163 A1 * | 7/2006 | James | 370/352 |
| 2006/0274706 A1 * | 12/2006 | Chen et al. | 370/340 |
| 2008/0215969 A1 * | 9/2008 | Boguraev et al. | 715/256 |

OTHER PUBLICATIONS

Charpentier F et al Tubach J P et al: "Pitch-Synchronous Waveform Processing Techniques for Text-To-Speech Synthesis Using Diphones" Proceedings of the European Conference on Speech Communication and Technology (Eurospeech). Paris, Sep. 26-28, 1989, Edinburgh, CEP Consultants, GB, vol. 2 conf. 1, Sep. 1, 1989, pp. 13-19, XP000209945.

* cited by examiner

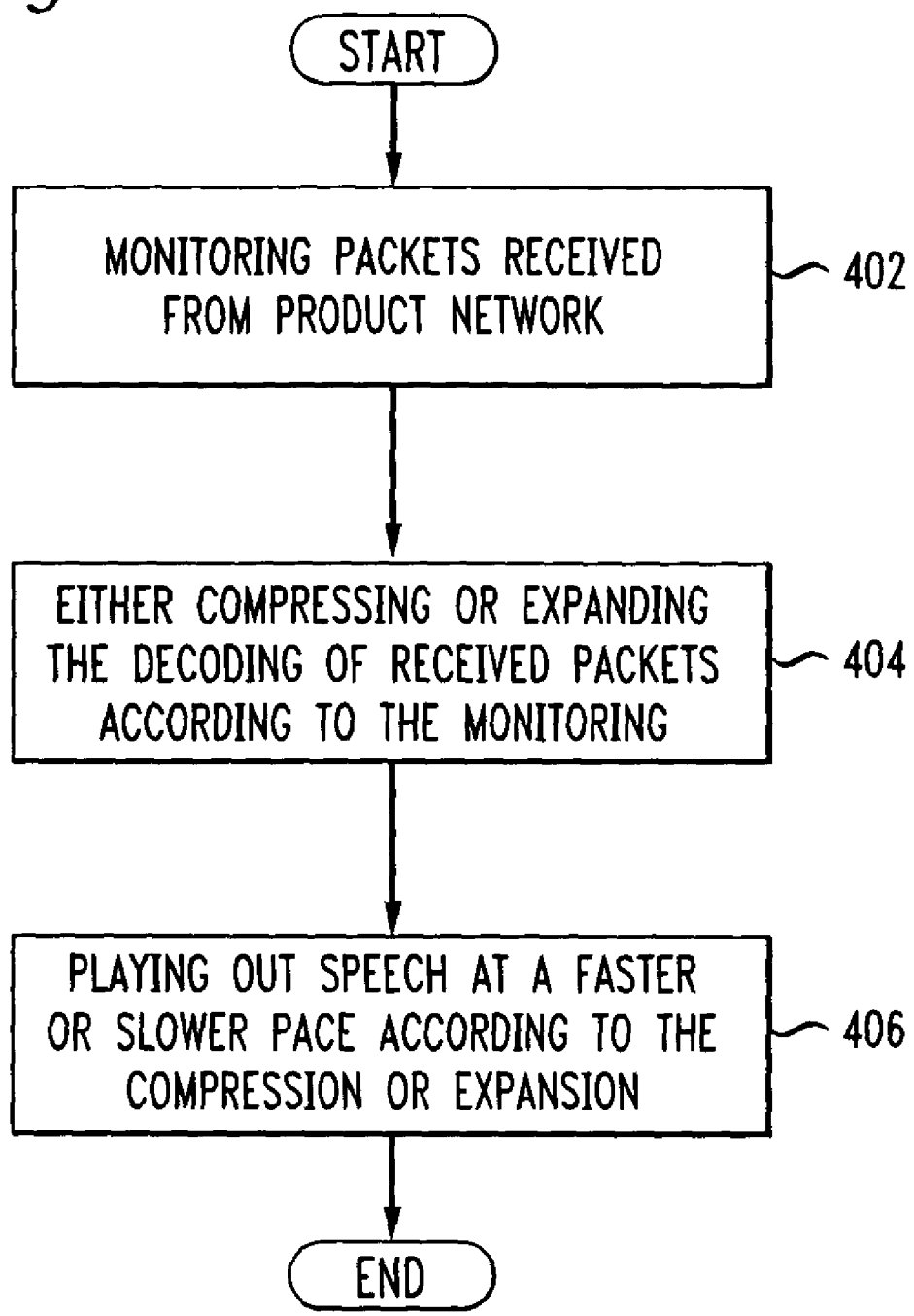

SYSTEM AND METHOD FOR MODIFYING SPEECH PLAYOUT TO COMPENSATE FOR TRANSMISSION DELAY JITTER IN A VOICE OVER INTERNET PROTOCOL (VOIP) NETWORK

BACKGROUND OF THE INVENTION

1. Field of the Invention

The present invention relates to voice over IP applications and more specifically to a system and method of modifying the speed of playout for received speech to compensate for delay jitter.

2. Introduction

The present invention relates to the Voice over Internet protocol (VoIP). Just like the name suggests, VoIP uses the Internet Protocol (IP) to send/receive voice as data packets over an IP network as is shown by the arrangement 100 in FIG. 1. By using a VoIP protocol, voice communications can be achieved on any IP network 104 regardless of the fact that it is Internet, Intranets, Local Area Networks (LAN), etc. In a VoIP enabled network, the digitized voice signal is encapsulated in IP packets by a compute device 102 and then sent over the IP network 104. A VoIP signaling protocol is used to set up and tear down calls, carry information required to locate users and negotiate capabilities (such as bandwidth). At the receiving end, a compute device 106 receives the packets, performs processing such as stripping the voice information from the signaling information, decoding and presenting via a speaker the transmitted speech. A known advantage of VoIP is the relatively low cost of the phone call. Other factors are also important, such as the integration of voice, data and video on one network as well as new services available on the converged network and simplified management of end user terminals.

Several VoIP protocol stacks have derived from various standard bodies and vendors, namely H.323, SIP, MEGACO and MGCP. These standards are known to those of skill in the art and information is readily available. The present invention is independent of any specific protocol associated with VoIP.

VoIP has one benefit of the coming convergence between data and voice telecommunications networks. It allows its users to send voice transmissions over the Internet. However, the Internet's design can cause problems that can slow the growth of VoIP. Since the Internet is an environment created to carry data, it was not originally intended to transmit lag-sensitive voice signals.

As is common with the Internet, the individual packets associated with the transmitted data may arrive at the end point at different times. Furthermore, some packets may arrive at the end point out of order. In a live conversation between two people using VoIP, these problems with the manner in which packets are transmitted through the Internet can cause a delay in speech, jitter in the received speech information or other problems that can reduce the clarity and naturalness of the conversation.

This problem with VoIP technology can be characterized by a transmission variable called delay jitter. The existence of delay jitter is incompatible with the requirements of standard speech decoders which function in a time constant manner. The current solution to this problem is to implement a jitter buffer that smooths out the delay variations associated with received packets. For example, a built-in delay of 1/10th of a second at the end point of the communication can enable a buffering of packets for a period of time to allow delayed packets and packets delivered out of order to be assembled appropriately and delivered at a constant time to a speech decoder.

While the buffet strategy works it comes at the expense of adding delay which is inherent in the use of the delay buffer. This increased connection delay exacerbates echo related problems and where excessive delays can break down the natural cadence of conversations. Furthermore, in many cases, conversations occur between people who live far apart across the world and were conversations may also be transmitted to least in part through a satellite link. The delay introduced by distance plus the delay introduced by a delay jitter buffer causes a performance penalty that can prevent further acceptance of the voice technology.

One attempt to reduce the delay caused by the delay jitter buffer is to provide a dynamically modifiable buffer. In this attempt to solve the problem, the buffers are allowed to shrink and to grow themselves based on received data associated with how quickly or how slowly or how out of order received packets are. Tailoring the buffers dynamically according to the current flow of packets can reduce some of the delay involved in the process but also necessarily requires the step of determining package delivery speed which in and of itself introduces further delay, and the dynamics involved in growing and shrinking in size can itself introduce voice quality problems.

Therefore, even with the attempt of modifying the buffer size to accommodate and to improve the delay when using the delay buffers, these buffers whether modifiable or not still often introduce delay that is unacceptable for pleasant voice conversations. What is needed in the art is a system and method of reducing the delay in VoIP applications.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

A system, method and computer-readable medium for reducing delay introduced by de-jitter buffers in a VoIP network is presented. The method aspect of the invention relates to receiving and presenting speech data received from a VoIP network. The method comprises monitoring speech-related packets received from a packet network and based on the monitoring, either maintaining a normal speech rate, compressing the speech rate or expanding the speech rate. The speech associated with the received packets is played out (presented audible via a speaker or other means) at the normal, compressed or expanded speech rate.

Another aspect of the invention provides for a synchronization of video data associated with the received speech packets. In a video conferencing context, where the speech rate is compressed or expanded, the video may become out of synchronization with the audio. Therefore, an aspect of the invention provides for a module to synchronize the video with the audio when the speech rate of the audio changes.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 4 illustrates a method embodiment of the invention.

DETAILED DESCRIPTION OF THE INVENTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The present invention includes a system, method and computer-readable media for providing time compression or expansion of speech play-out as a compensation strategy for transmission delay jitter in a VoIP networks. The invention eliminates the VoIP network de-jitter buffer which is commonly used and smooths out the packet network jitter through a time compressor/expander process that stretches the speech rate (slow it down) when packets arrive behind schedule and shrinks the speech rate (speed it up) when packets arrive early.

Packets arriving "on time" get decoded and played to the listener at their "normal" speech rate. Time compression/expansion of speech technology is known to those of skill in the art and can deliver good quality audio when done in conjunction with pitch-correction. Pitch correction may occur according to any algorithm and may be performed in the time domain or the frequency domain. For example, there are a number of time domain pitch shifting algorithms such as the Pitch-Synchronous Overlap-Add (PSOLA) algorithm and a time shifting algorithm. The time domain approach is preferable but these and other approaches may be employed.

Figure 1:
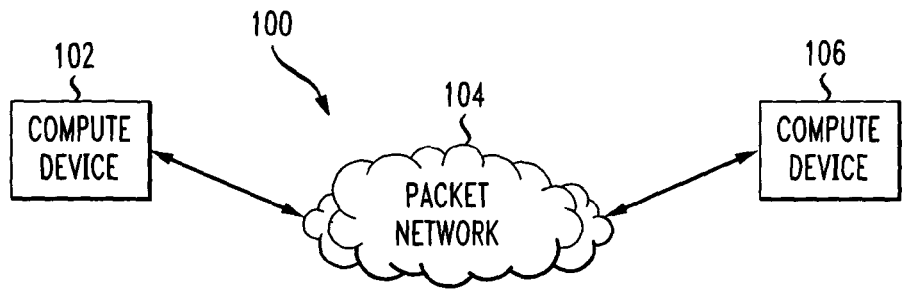
FIG. 1 illustrates a prior art VoIP system.
Figure 2:
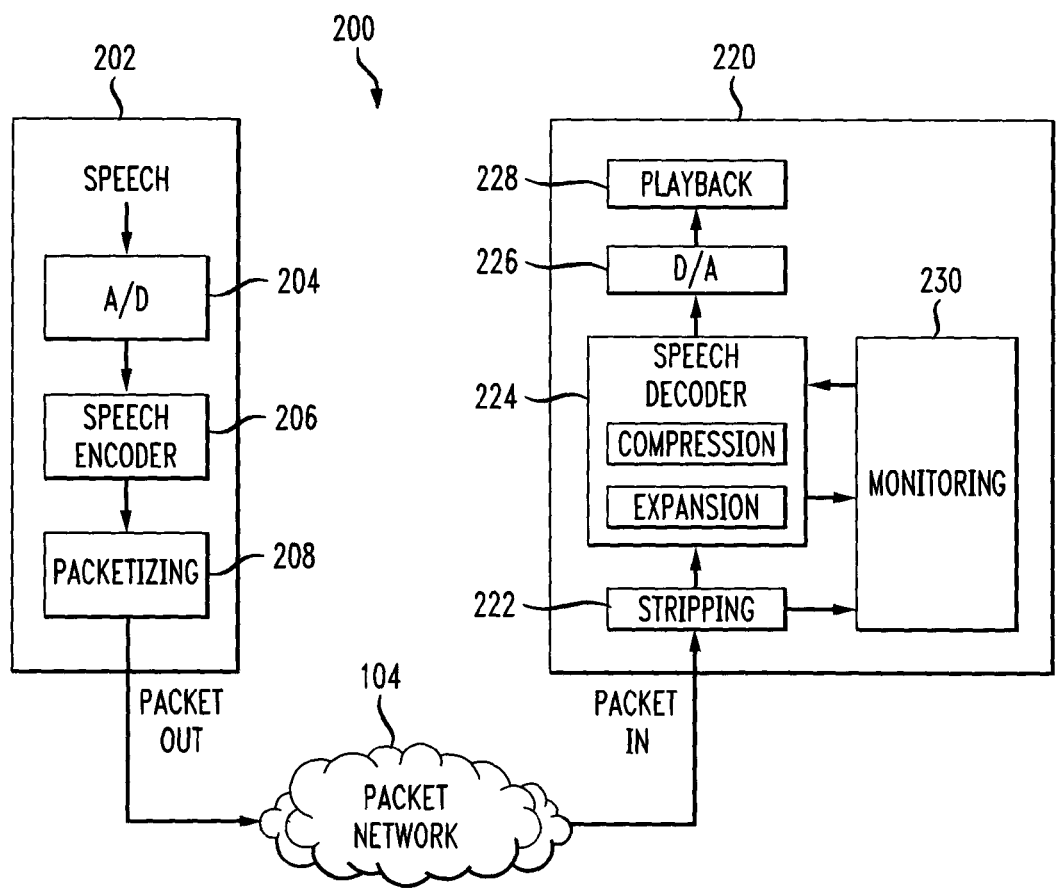
FIG. 2 illustrates a VoIP system according to an aspect of the invention.

The basic architecture 200 of the present invention is shown in FIG. 2. A speech transmission computing device 202 receives speech from a user via a known transducer such as a microphone (not shown) and performs an analog to digital (A/D) conversion using a converter 204 which then transmits the digitized speech data to a speech encoder 206. The encoded speech is packetized via a packetization module 208 and transmitted to a packet network 104 such as the Internet.

After transmission through the packet network 104, the packets are received by a computing device 220. The packets have to be received and processed before the speech data contained within them can be audibly played out to the listener. A stripping module 222 may be employed to perform functions such as removing the control and address information within each packet to facilitate the subsequent conversion of the data by the speech decoder 224. After such processing, the packets are then transmitted to a speech decoder 224 which decodes the packetized data and transmits the decoded data to a digital to audio (D/A) conversion module 226. The analog data is heard by recipient via a speaker or other playback component 228.

In one aspect of the invention, the speech decoder 224 comprises a compression module and expansion module. However, there is no limitation on where in the computing device 220 the compression and expansion occurs. These modules may exist separate from the decoder. In one aspect of the invention, the decoder 224 senses the speed at which packets are received and makes the appropriate compression and expansion decisions of the data. It is preferable that the speech decoder 224 communicate with a monitoring module 230. The monitoring module has a purpose of determining packet reception rate. This may involve "peeking" ahead at speed and rate of received packets in order to instruct the decoder regarding whether to compress, expand or maintain a normal speech playout. In one aspect of the invention, the monitoring module will employ a buffer to perform its tasks. However, such a buffer differs from known jitter buffers in VoIP in that it would not introduce as much delay as de-jitter buffers.

In the architecture shown in FIG. 2, the de-jitter buffer is eliminated. They are several advantages to the elimination of the de-jitter buffer. One advantage is that it simplifies the receiving speech computing device 220, which thus makes it less expensive to manufacture. Another advantage is that with the elimination of the de-jitter buffer, the delay inherent in the de-jitter buffer is also eliminated which can improve customer acceptance of avoid service.

Another aspect of the invention is that in addition to the compression or expansion in time as a player out strategy for the speech performed preferably by the decoder 224, pitched correction technology is also employed to allow one to change the rate at which the speech is spoken. For example, the receiving computing device 220 may either increase or decrease the playout rate of speech heard by the recipient while making simultaneous pitch corrections to the speech. Therefore, while compression and expansion technology is employed adaptively to speed up or slow down the rate of speech in synchronization with the time variation of the transmission of speech information through the VoIP network, simultaneous pitch corrections are also employed to maintain the normal sound of the speech.

Pitch correction may be based on a number of different factors. For example, the amount of correction may be determined by a pitch correction module according to the manner in which packets are received from the VoIP network, or based on the output of the decoder and according to the modified (expanded or compresses) voice communication that will be transmitted to a speaker component for audio playout to the recipient. The amount of pitch correction will be based on some type of input or feedback which will govern an amount or a degree of pitch correction in order to attempt to maintain a normal sound heard by the recipient.

In another aspect of the invention, the sender or the recipient may manually select a pitch correction parameter such as to speed up or slow down the speech. This may be preferable where, for example, a recipient would like to speed up the received voice in that at the normal pace, the voice appears to be too slow for an acceptable cadence of the conversation over a VoIP network.

Figure 3:
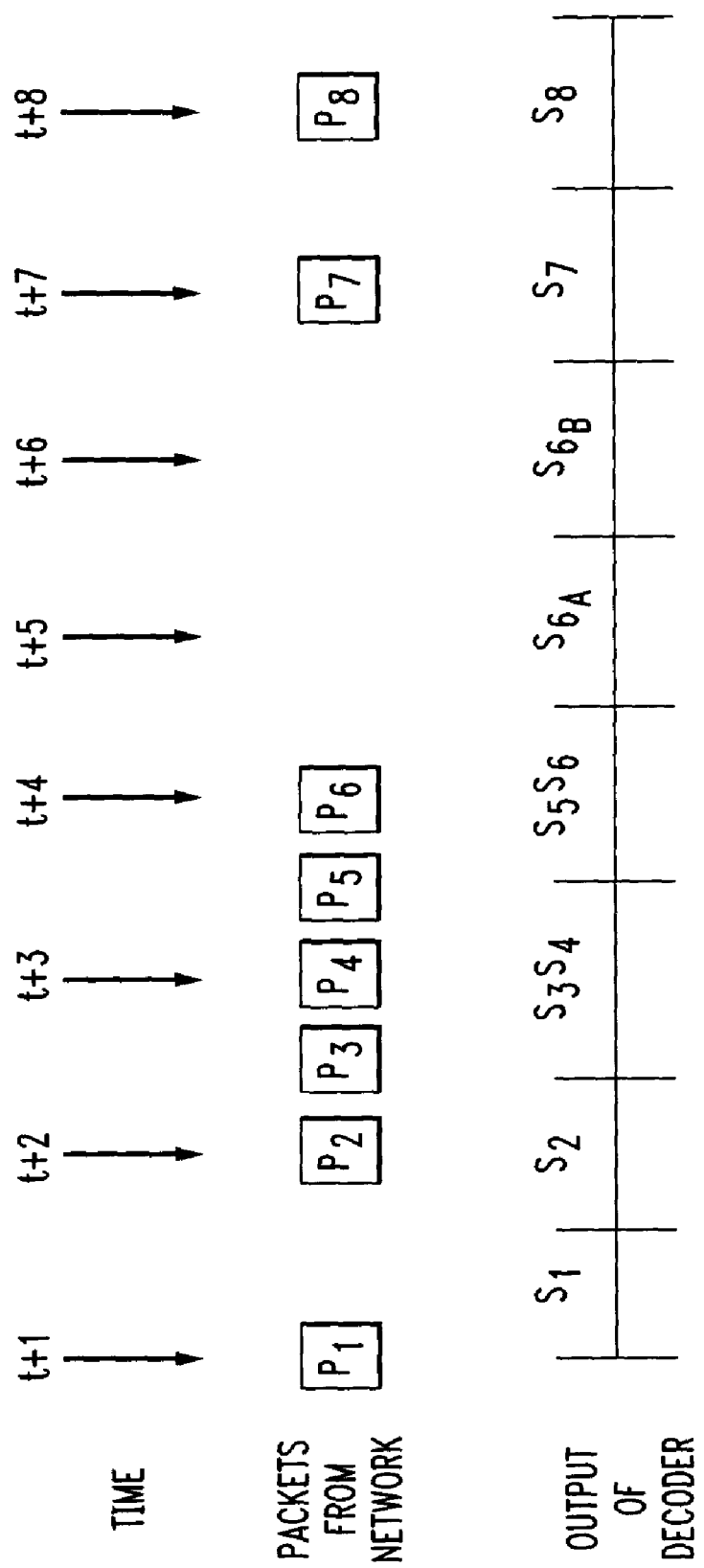
FIG. 3 illustrating the timing of received packets using the principles of the invention.

FIG. 3 illustrates an exemplary timing relationship between a sequential speech packets received from the packet network 104 shown in FIG. 2. A set of packets received from the networks showed in connection with the arrival T+1, T+2 and so forth. As is shown by way of example, packet one arrives at time T+1, packet 2 arrives at time T+2 and packets 3, 4, 5 and 6 arrive at around the T+3 and T+4 time frames. With this burst of the reception of packets of during these time frames, FIG. 3 shows that speech segment 1 is output from the decoder at time T+1, speech segment 2 is output at time T+2, while speech segments 3 and 4 are output at time T+3 and speech segments 5 and 6 are output at time T+4. Next, FIG. 3 shows a delay in the reception of packets during times T+5 and T+6. During these times, speech segments 6A and 6B are output from the decoder in time T+7. Packet 7 is received at time T+7 and speech segment 7 as output from decoder at the same time frame. At time T+8, packet 8 is received and speech segment 8 is output from decoder. Thus, at times T+7 and T+8, the decoder output is at a normal speech rate.

As mentioned above, in addition to compression as shown at times to plus three in T+4 and expansion as shown at T+5 and T+6, pitch correction is also employed to ensure good quality audio.

FIG. 4 illustrates a method embodiment of the invention. The method comprises monitoring for packets received from a packet network 402. A computing device practicing the method either compresses or expands the presented speech rate of received packets according to the monitoring 404. The speech is played out of a faster or slower pace according to the compression or expansion 406. If packets are arriving on time and/or at a constant rate then that the speech rate would remain at a normal pace. Another component of the method comprises performing pitch corrections on the played out speech when it is compressed or expanded according to the monitoring of the packets received from the packet network.

Therefore, the introduction of combining compression/expansion of speech, and its associated pitch correction, with the play-out process of a VoIP egress gateway can eliminate the need for a VoIP network de-jitter buffer and thus, eliminate the delay penalty associated with this buffer.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. For example, the present invention is not limited just to speech data but may also be used to reduce delay in video data or multi-media data over an IP network where packets may arrive at a destination compute device delayed or out of order. If a video data accompanies the audio data, for example in a video conferencing application, the invention may further include, when an audio signal is compressed or expanded (and perhaps where pitch correction is employed), synchronizing the video with the audio. This would occur where speech is slowed down or sped up which may cause it to become out of synchronization with the video of the person talking. This aspect of the invention could maintain the synchronization between the image of the person talking and the modified audio. This may be performed by a module or logic associated with the speech decoder or the recipient computing device. The video may be an actual live video of the person or a synthesized avatar or agent generated and presented at the recipient computing device.

There is also no limitation on the invention being applied to a wired device. For example, any wireless network or protocol that has a packet network component or packet delivery protocol or the like may benefit from the application of this invention. Accordingly, the appended claims and their legal equivalents should only define the invention, rather than any specific examples given.

I claim:

1. A method of presenting a voice communication associated with data received from a voice-over-IP network, the method comprising:
   receiving packets associated with the voice communication; and
   modifying a speech rate when presenting the voice communication to a recipient based on the how the packets are received from the voice-over-IP network, wherein modifying the speech rate further comprises, if packets arrive late, slowing the speech rate down, and if packets arrive early, speeding the speech rate up.

2. The method of claim 1, wherein modifying the speed at which the voice communication is played out to the recipient further comprises one of time compressing the voice communication or time expanding the voice communication.

3. The method of claim 1, further comprising:
   analyzing the reception of packets associated with the voice communication from the sender, wherein modifying the speech rate is based upon the analysis of the received packets.

4. The method of claim 1, further comprising performing pitch correction on the modified voice communication.

5. The method of claim 1, wherein if packets are received at a constant rate, then modifying the speech rate comprises presenting the voice communication at a normal rate.

6. The method of claim 1, further comprising, if video data is associated with the voice communication:
synchronizing the video data according to the modification of the speech rate of the voice communication.

7. A method of receiving and presenting speech data received from a VoIP network, the method comprising:
monitoring speech-related packets received from a packet network; and
playing out speech associated with the packets, based on the monitoring, at one of a normal speech rate, a compressed speech rate and an expanded speech rate, wherein if video data is associated with the speech-related packets, the method further comprises synchronizing the video data with the speech according to how the speech is played out.

8. The method of claim 7, further comprising, if the speech rate is compressed or expanded, then performing pitch correction on the played out speech.

9. A system for presenting a voice communication associated with data received from a voice-over-IP network, the system comprising:
a first module controlling a processor to receive packets associated with the voice communication; and
a second module controlling a processor to modify a speech rate when presenting the voice communication to a recipient based on the how the packets are received from the voice-over-IP network, wherein the second module modifies the speech rate, if packets arrive late, by slowing the speech rate down, and if packets arrive early, by speeding the speech rate up.

10. The system of claim 9, further comprising a module configured to perform pitch correction on the voice communication when its speech rate is modified.

11. The system of claim 9, further comprising a module configured to synchronize video data when a speech rate is modified.

12. A system for presenting a voice communication associated with data received from a voice-over-IP network, the system comprising:
means for receiving packets associated with the voice communication; and
means for modifying a speech rate when presenting the voice communication to a recipient based on the how the packets are received from the voice-over-IP network, wherein the means for modifying the speech rate further modifies the speech rate, if packets arrive late, by slowing the speech rate down, and if packets arrive early, by speeding the speech rate up.

13. The system of claim 12, further comprising means for performing pitch correction for the voice communication when the speech rate is modified.

14. The system of claim 12, further comprising means for synchronizing video data that is associated with the voice communication according to the modified speech rate.

15. A non-transitory computer-readable medium storing instructions for controlling a computing device to present a voice communication received from a voice-over-IP network, the instructions comprising:
receiving packets associated with the voice communication;
modifying a speech rate when presenting the voice communication to a recipient based on the how the packets are received from the voice-over-IP network to yield a modified speech rate; and
synchronizing video data associated with the voice communication according to the modified speech rate.

16. The non-transitory computer-readable medium of claim 15, wherein the instructions further comprise performing pitch correction for the voice communication when the speech rate is modified.

17. The non-transitory computer-readable medium of claim 15, wherein the instructions further comprise:
if video data is associated with the voice communication, synchronizing the video data with the voice communication according to the modified speech rate.

\* \* \* \* \*